(12) United States Patent
Ren et al.

(10) Patent No.: US 8,983,392 B2
(45) Date of Patent: Mar. 17, 2015

(54) METHOD FOR CONTROLLING DRIVE TEST LOGGED MEASUREMENT, DRIVE TEST SYSTEM AND USER EQUIPMENT

(75) Inventors: Longtao Ren, Shenzhen (CN); Lifeng Han, Shenzhen (CN); Yin Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 244 days.

(21) Appl. No.: 13/583,008

(22) PCT Filed: Jan. 6, 2011

(86) PCT No.: PCT/CN2011/070060
§ 371 (c)(1),
(2), (4) Date: Sep. 6, 2012

(87) PCT Pub. No.: WO2011/157062
PCT Pub. Date: Dec. 22, 2011

(65) Prior Publication Data
US 2012/0329402 A1    Dec. 27, 2012

(30) Foreign Application Priority Data

Jun. 13, 2010  (CN) .......................... 2010 1 0208734

(51) Int. Cl.
*H04B 17/00*    (2006.01)
*H04W 24/10*    (2009.01)
*H01Q 11/12*    (2006.01)

(52) U.S. Cl.
CPC .................................... *H04W 24/10* (2013.01)
USPC ....................................... 455/67.11; 455/423

(58) Field of Classification Search
CPC ................................................. H04W 24/10
USPC ............................................... 455/67.11, 423
See application file for complete search history.

(56) References Cited

U.S. PATENT DOCUMENTS

| 7,003,290 | B1 | 2/2006 | Salonaho |
| 7,499,701 | B2 | 3/2009 | Salonaho |

(Continued)

FOREIGN PATENT DOCUMENTS

| CN | 1863357 A | 11/2006 |
| CN | 101321366 A | 12/2008 |

(Continued)

OTHER PUBLICATIONS

Ericsson, Triggers for logged MDT measurement reporting, 3GPP TSG-RAN WG2 #69, San Francisco, Feb. 22, 2010, 3 total pages.

(Continued)

*Primary Examiner* — Lee Nguyen
(74) *Attorney, Agent, or Firm* — Oppedahl Patent Law Firm LLC

(57) ABSTRACT

The disclosure discloses a method for controlling Drive Test (DT) logged measurement, a DT system and User Equipment (UE). The method comprises the steps of: sending a logged measurement duration time to a UE by a network side or setting the logged measurement duration time by the UE itself; recording and reserving, by the UE, a measurement result obtained by DT; deleting the measurement result by the UE when the logged measurement duration time expires or the measurement result is reported during the logged measurement duration time. The disclosure makes the UE more efficient in reporting the measurement result and managing the storage space, thus saving memory space.

11 Claims, 5 Drawing Sheets

(56) References Cited

U.S. PATENT DOCUMENTS

2006/0084390 A1     4/2006   Salonaho
2008/0062913 A1     3/2008   Zander
2011/0195668 A1*    8/2011   Lee et al. .................. 455/67.11
2012/0309404 A1*   12/2012   Suzuki et al. ................ 455/450

FOREIGN PATENT DOCUMENTS

JP      2008172380 A    7/2008
JP      2013519330 A    5/2013
WO      2011099726 A2   8/2011

OTHER PUBLICATIONS

Orange, Telecom Italia, Deutsche Telekom, MDT Measurement Model, 3GPP TSG-RAN WG2 Meeting #68bis, Valencia, Jan. 18, 2010, 3 total pages.

LG Electronics Inc., Validity timer of MDT configuration, 3GPP TSG-RAN2 Meeting #70, Montreal, May 14, 2010, 2 total pages.

LG Electronics Inc, Validity of MDT log after logging duration timer expiry, #GPP TSG WG2 #70bis, Stockholm, Jul. 2, 2010, 2 total pages.

International Search Report on international application No. PCT/CN2011/070060, mailed on Apr. 7, 2011.

English Translation of the Written Opinion of the International Search Authority in international application No. PCT/CN2011/070060, mailed on Apr. 7, 2011.

3GPP TS 37.320 V0.5.0; 3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10); May 2010. (13 pages-see entire document).

3GPP TSG-RAN2#70, Log availability indication condition and configuration state R2-102905, NTT DOCOMO, Inc., Montreal, Canada, May 14, 2010.

* cited by examiner

METHOD FOR CONTROLLING DRIVE TEST LOGGED MEASUREMENT, DRIVE TEST SYSTEM AND USER EQUIPMENT

FIELD OF THE INVENTION

The disclosure relates to a radio cellular communication system, more particularly, to a method for controlling Drive Test (DT) logged measurement, a DT system and User Equipment (UE) in a radio mobile communication system.

BACKGROUND OF THE INVENTION

A Long Term Evolution (LTE) network consists of an Evolved UMTS (Universal Mobile Telecommunications System) Terrestrial Radio Access Network (E-UTRAN) Evolved Node B (eNB) and Evolved Packet Cores (EPC), wherein the network fabric is flat. The EUTRAN includes a set of eNBs connected with the EPC via S1 interfaces; the eNBs can be interconnected via X2, wherein the S1 and the X2 are logic interfaces. One EPC can manage one or more eNBs; one eNB also can be controlled by a plurality of EPCs; and one eNB can manage one or more cells. The EPC consists of a Mobility Management Entity (MME), a Serving Gateway (SGW), and a Packet Data Network Gateway (PGW). A UMTS consists of a UMTS Terrestrial Radio Access Network (UTRAN) and a Core Network (CN), wherein the UTRAN consists of a Radio Network Controller (RNC) and a NodeB.

Radio network optimization is an important link in the construction of mobile communication network; Particularly in the initial stage of network construction, radio network performance is further optimized and communication quality is improved by means of frequency allocation, adjustment of site parameters, and the like. The basic flow of the radio network optimization is generally divided into five stages: optimization preparation, data collection, data analysis, optimization implementation, optimization evaluation. Generally, the radio network performance is reflected by indexes such as radio coverage, call through rate, call dropping rate, voice quality and system capacity. Therefore, the radio network optimization is based on measurement and collection of the true values of these indexes which is generally performed through Drive Test (DT), i.e., manually detecting the network through DT instrument or UE. The test method of DT is in general as follows: first, it is necessary to select a test area and a test route, wherein the test route can be obtained according to statistics on the network performance or the requirement of an operator, the focusing area can be a densely populated downtown area, a main road in a city, a residential area, a high way, a railway, and so on; A test vehicle is equipped with a testing cell phone or a DT instrument and has a GPS function and function of recording test logs. The test vehicle drives along the test route. The DT instrument or UE initiates various services, tests the needed test indexes, for example, transmission power, radio signal quality, successful switch rate, call dropping rate, and so on, and records the test result. The planning and optimization of the radio network can be carried out based on analysis of the DT test result. The DT can carry out fairly well the test and evaluation of the mobile network, however, with the defect of huge waste in manpower, material resources, and time. Thus, a better way is to employ DT UEs in the network to perform the DT, which can be done in a wide range as required without waste of massive manpower or material resources. A method of performing DT using UEs in the radio mobile communication system is that: a Radio Access Network (RAN) side sends to the UEs the measurement configuration and report information of DT through a Control Plane (CP) according to the requirement of network management; is after the DT is carried out by a UE and the report conditions of DT result are met, the UE reports the DT result to the RAN through CP signaling; then the RAN can process the collected DT result information itself or send the collected DT result information to the network management, thus realizing a Minimizing Drive Test (MDT); wherein the measurement of DT includes measurement of an idle state IDLE and measurement of a connection state CONN. After obtaining a specific measurement result, the UE can store the measurement result and report the measurement result when the report conditions are met. Here, the report conditions can be: report based on an absolute time, periodic report, report based on memory usage or location, report while away from the area of user complaints, or a combination of various conditions. The DT can also be divided into Immediate DT and Logged DT based on whether to report instantly after measurement. For the mode of Logged DT, after the UE receives a DT measurement configuration sent by the network side, wherein the configuration has a duration time, and during the configuration duration time, the UE can perform DT measurement; when the configuration duration time expires, the UE stops logging; after the logging is stopped, if the UE continues to keep the unreported measurement result, a lot of memory of the UE will be occupied, resulting in slow operation of the UE. Therefore, it is necessary to perform effective control over the logged measurement of DT.

SUMMARY OF THE INVENTION

The technical problem to be solved by the disclosure is to provide a method for controlling DT logged measurement, a DT system and a UE, to effectively control and manage the logged measurement.

The technical problem to be solved by the disclosure is to provide a method for controlling DT logged measurement, including:

sending logged measurement duration time to a UE by a network side or setting the logged measurement duration time by the UE itself;

recording and reserving, by the UE, a measurement result obtained through DT; and deleting the measurement result by the UE when the logged measurement duration time expires or the measurement result is reported during the logged measurement duration time;

wherein the logged measurement duration time may start timing when configuration duration time expires, or when a first measurement result is recorded, or the logged measurement duration time may start timing for each measurement result when each measurement result is recorded; wherein the configuration duration time is sent to the UE by the network side;

wherein the step of deleting the measurement result by the UE may be triggered by previously occurred expiration of the logged measurement duration time or the reporting of the measurement result;

wherein in the step of sending logged measurement duration time to the UE by a network side, the network side may send the logged measurement duration time through a DT dedicated message or a common message; wherein the DT dedicated message refers to a DT dedicated configuration message (MDTMeasConfiguration), a Radio Resource Control (RRC) connection release message (RRCConnectionRelease), an RRC reconfiguration message (RRCConnection Reconfiguration) or an eNB configuration update message (eNB Configuration Update).

In order to solve the technical problem above, the disclosure further provides a DT system, including a UE and a network optimization unit, wherein the UE is configured to receive logged measurement duration time sent by the network optimization unit, record and reserve a measurement result obtained through DT, and delete the measurement result when the logged measurement duration time expires or the measurement result is reported during the logged measurement duration time;

the network optimization unit is implemented at the network side and configured to send DT configuration information including the logged measurement duration time to the UE, and receive the DT measurement result reported by the UE;

wherein the UE may include:

a logged measurement timing module configured to perform logged measurement timing, and notify a DT module to delete the DT result when the logged measurement duration time expires;

the DT module connected with the logged measurement timing module and configured to receive the DT configuration information sent by the network optimization unit, perform DT according to the DT configuration, record and reserve the DT result, and delete the DT result when receiving a notification from the logged measurement timing module or a report module; and the report module connected with the DT module and configured to report the DT result, and notify the DT module to delete the DT result after reporting the DT result;

wherein the DT configuration information sent by the network optimization unit may further include the configuration duration time; wherein the UE further includes a configuration timing module connected with the DT module and the logged measurement timing module, wherein the configuration timing module is configured to perform configuration timing, and notify the DT module to stop DT and notify the logged measurement timing module to start timing when the configuration duration time expires;

wherein the DT module may be further configured to notify the logged measurement timing module to start timing when a first measurement result is recorded, or notify the logged measurement timing module to start timing for each measurement result when each measurement result is recorded;

wherein the report module is further connected with the logged measurement timing module and configured to notify the logged measurement timing module to stop timing after reporting the DT result;

wherein the network optimization unit is configured to send the DT configuration information to the UE through the following ways: sending the logged measurement duration time through a DT dedicated message or a common message.

In order to solve the technical problem above, the disclosure also provides a UE, including: a DT module, a logged measurement timing module and a report module, wherein the logged measurement timing module is configured to perform timing, and notify the DT module to delete a DT result when logged measurement duration time expires; wherein the logged measurement duration time is preset by the UE;

the DT module is connected with the logged measurement timing module and configured to perform DT, record and reserve the DT result, and delete the DT result when receiving a notification from the logged measurement timing module or the report module;

the report module is connected with the DT module and configured to report the DT result, and notify the DT module to delete the DT result after reporting the DT result;

wherein the DT module may be configured to perform DT through the following ways: performing DT according to DT configuration information sent by the network side, wherein the DT configuration information includes configuration duration time;

the UE may further include a configuration timing module connected with the DT module and the logged measurement timing module, wherein the configuration timing module is configured to perform configuration timing, and notify the DT module to stop DT and notify the logged measurement timing module to start timing when the configuration duration time expires;

wherein the DT module may be further configured to notify the logged measurement timing module to start timing when a first measurement results recorded, or notify the logged measurement timing module to start timing for each measurement result when each measurement result is recorded;

wherein the report module may be further connected with the logged measurement timing module and configured to notify the logged measurement timing module to stop timing after reporting the DT result.

In the method for controlling DT logged measurement, the DT system and the UE, the network side sends logged measurement duration time to the UE or the UE sets logged measurement duration time itself, when the logged measurement duration time expires or the measurement result is reported during the logged measurement duration time, the UE deletes the measurement result, thereby controlling the length of the duration time of the reservation of the measurement result in the UE when the UE is not triggered to report the measurement result in a long time; therefore, the UE reports the measurement result and manages the storage space much more effectively, thus memory space is saved.

PREFERRED EMBODIMENTS OF THE INVENTION

The main idea of the method for controlling DT logged measurement, the DT system and UE is that: the network side sends a logged measurement duration time to the UE or the logged measurement duration time is set by the UE itself; when the logged measurement duration time expires or the measurement result is reported during the logged measurement duration time, the UE deletes the measurement result, thereby controlling the length of the duration time of the reservation of the DT measurement result by the UE when the UE is not triggered to report the measurement result in a long time, which makes the UE more efficient in reporting the measurement result and managing the storage space, and saves memory space.

Figure 1:
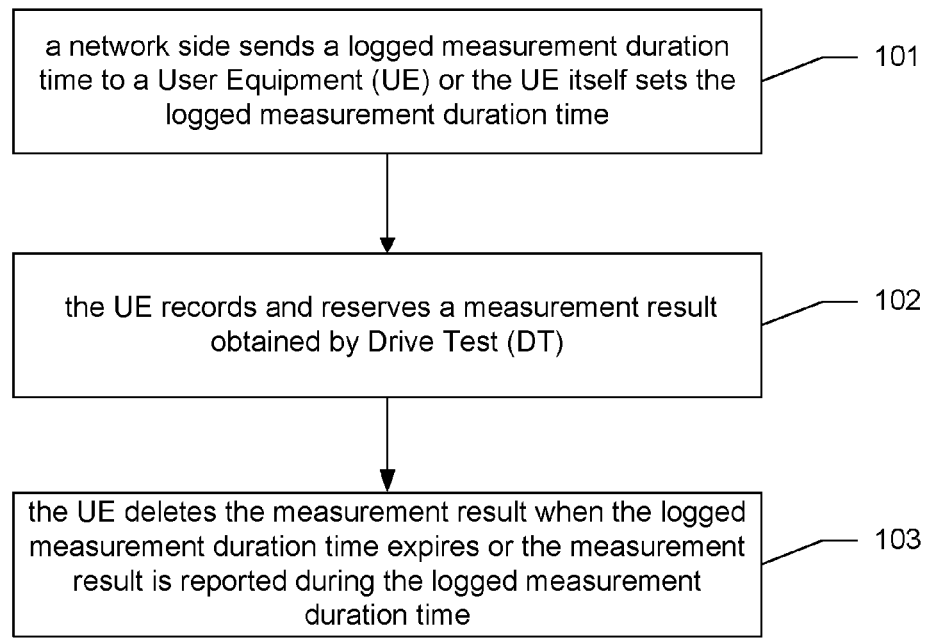
FIG. 1 shows a diagram of a method for controlling DT logged measurement according to the disclosure.

As shown in FIG. 1, the method for controlling DT logged measurement according to the disclosure includes:

Step 101: a network side sends a logged measurement duration time to a UE or the UE sets the logged measurement duration time itself;

the logged measurement duration time means that the UE stops the logging when the duration time of the measurement configuration expires; and, the UE will reserve the unreported measurement result during this logged measurement duration time.

Step 102: the UE records and reserves a measurement result obtained by DT.

Step 103: when the logged measurement duration time expires or the measurement result is reported during the logged measurement duration time, the UE deletes the measurement result;

that is, the deletion of the measurement result by the UE is triggered by the previously occurred expiration of the logged measurement duration time or the reporting of the measurement result.

During the logged measurement duration time, if an event triggering the reporting of the measurement result occurs (for example, the UE enters connection state again, and the network side requests UE to report measurement result), the UE reports and then deletes the stored DT measurement result; If the logged measurement duration time expires and no event triggering the reporting of the measurement result occurs (for example, the UE never enters connection state or the UE enters connection state but the network side does not retrieve the measurement results), the UE deletes the reserved and unreported DT measurement results.

The logged measurement duration timing may start from when the configuration takes effect, or may start from when a first measurement result is recorded, or can be carried out individually each time a measurement is recorded; Preferably, the timing may start from when the configuration duration time expires. The logged measurement duration time in the disclosure mainly serves to reserve the measurement result of DT in a reasonable duration while taking into account management of the UE memory.

The network side sends the logged measurement duration time through a DT dedicated message or a common message (for example, broadcast message), wherein the DT dedicated message refers to a DT dedicated configuration message (MDTMeasConfiguration), an RRC connection release message (RRCConnectionRelease), an RRC reconfiguration message (RRCConnection Reconfiguration) or an eNB configuration update message (eNB Configuration Update).

Embodiment 1

Figure 2:
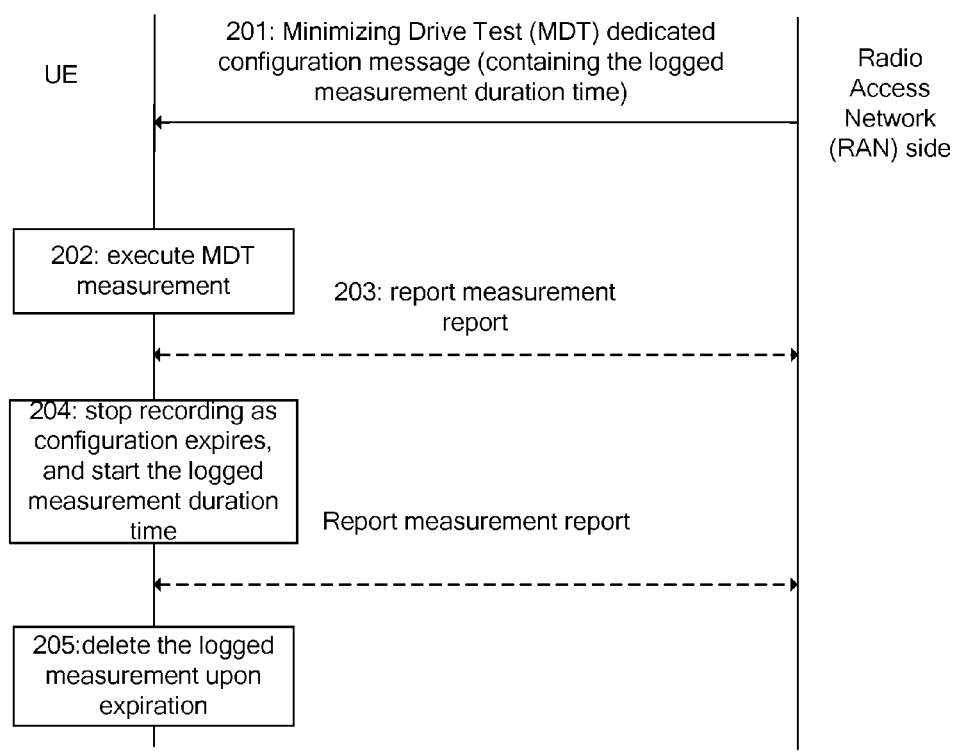
FIG. 2 shows a diagram of a method for controlling DT logged measurement implemented by sending logged measurement duration time through a DT dedicated configuration message according to the disclosure.

The Measurement Control Process of Sending the Logged Measurement Duration Time Through a Dedicated Message for DT Configuration (See FIG. 2)

Step 201: when the UE performs RRC connection establishment in a serving cell, the network side sends DT configuration information of delayed report (Logged MDT measurement configuration) through a dedicated DT configuration message (for example, MDTMeasConfiguration), wherein the DT configuration information includes measurement configuration content (for example, measurement frequency, cell, event of measurement triggering record, and so on), configuration duration time and logged measurement duration time (for example, LogKeep Timer).

Step 202: the measurement configuration takes effect after the UE receives the DT configuration information; at this moment, the configuration duration time starts. After the UE enters IDLE state, the UE performs, records, and stores the related measurement when the measurement triggering conditions of DT are met (for example, periodic pilot frequency measurement, or when serving cell signal is less than a threshold value).

Step 203: when the UE enters connection state again, the UE notifies the network side through a "Log Available" indication in RRCConnectionComplete that there is a DT measurement result available for reporting; after obtaining the notification by the indication, the network side requests the UE to report the DT measurement result through a UEInformationRequest message, if report is needed; then the UE reports the measurement result through a UEInformationResponse message.

Step 204: after the UE enters IDLE state again, the UE continues to record the measurement according to the previous measurement configuration; when the configuration duration time expires, the logged measurement duration time starts, and the UE stops recording the measurement but still reserves the measured and unreported measurement result.

Step 205: within the logged measurement duration time, the UE enters connection state again, reports the stored DT measurement result to the network side similar to process 3), and deletes the measurement result.

The measurement process of the UE under a DT measurement configuration of delayed report ends. The network side can send a new measurement configuration to the UE again to execute a new measurement process.

Embodiment 2

Figure 3:
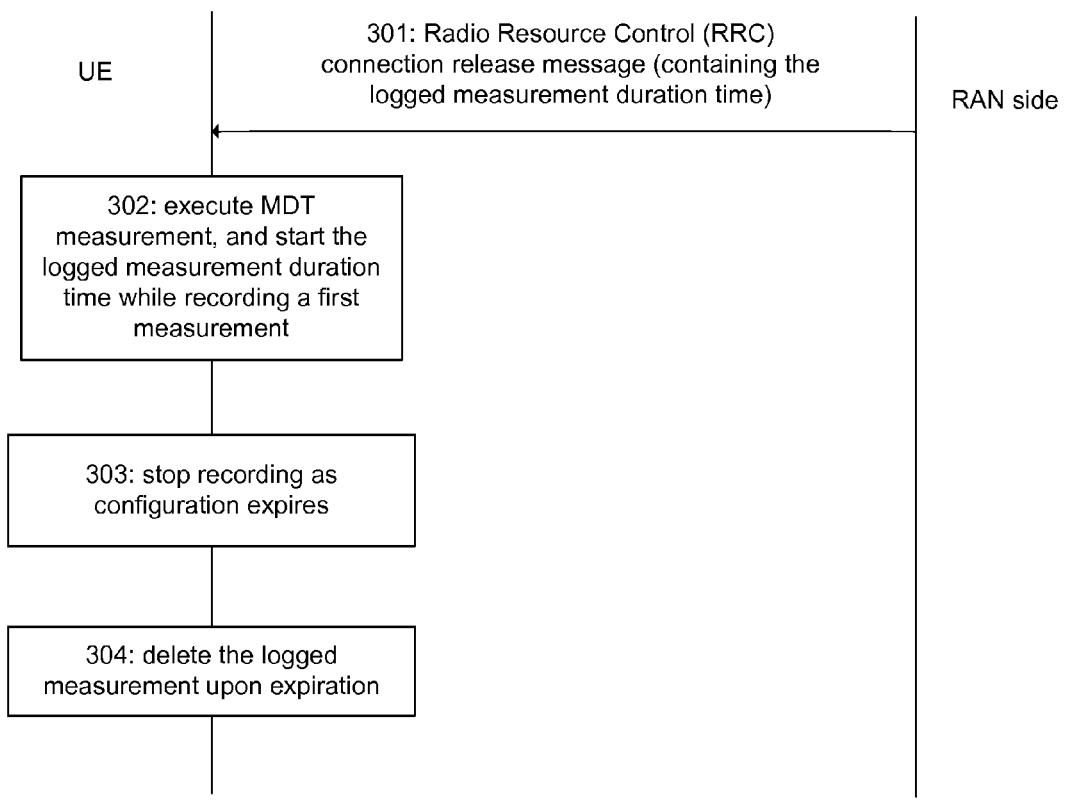
FIG. 3 shows a diagram of a method for controlling DT logged measurement implemented by sending logged measurement duration time through an RRC connection release message according to the disclosure.

The DT Measurement Control Process of Sending the Logged Measurement Duration Time Through an Existing Configuration Message (see FIG. 3)

Step 301: after the UE performs RRC connection establishment in a serving cell and enters connection state, the network side sends measurement configuration through a dedicated DT configuration message, and configures the logged measurement duration time of DT (for example, LogKeep Timer) in the RRC connection release message (RRCConnectionRelease) for the UE to release RRC connection and enter IDLE state, so as to send the logged measurement duration time to the UE.

Step 302: the measurement configuration takes effect after the UE receives the measurement configuration of DT. At this moment, the configuration duration time starts. After the UE enters IDLE state, the UE performs, records, and stores the related measurement, and starts the logged measurement duration time (for example, LogKeep timer) when a first measurement is recorded when the measurement triggering conditions of DT are met (for example, periodic pilot frequency measurement, or when serving cell signal is less than a threshold value).

Step 303: the UE keeps recording the related measurement and never reports the measurement result within the configuration duration time; when the configuration duration time expires, the UE stops the measurement recording but still reserves the measured and unreported measurement result.

Step 304: the UE remains in IDLE state within the logged measurement duration time; when the logged measurement duration time expires, the UE deletes the reserved and unreported measurement results.

The measurement process of the UE under a DT measurement configuration of delayed report ends. The network side can send a new measurement configuration to the UE again to execute a new measurement process.

Embodiment 3

Figure 4:
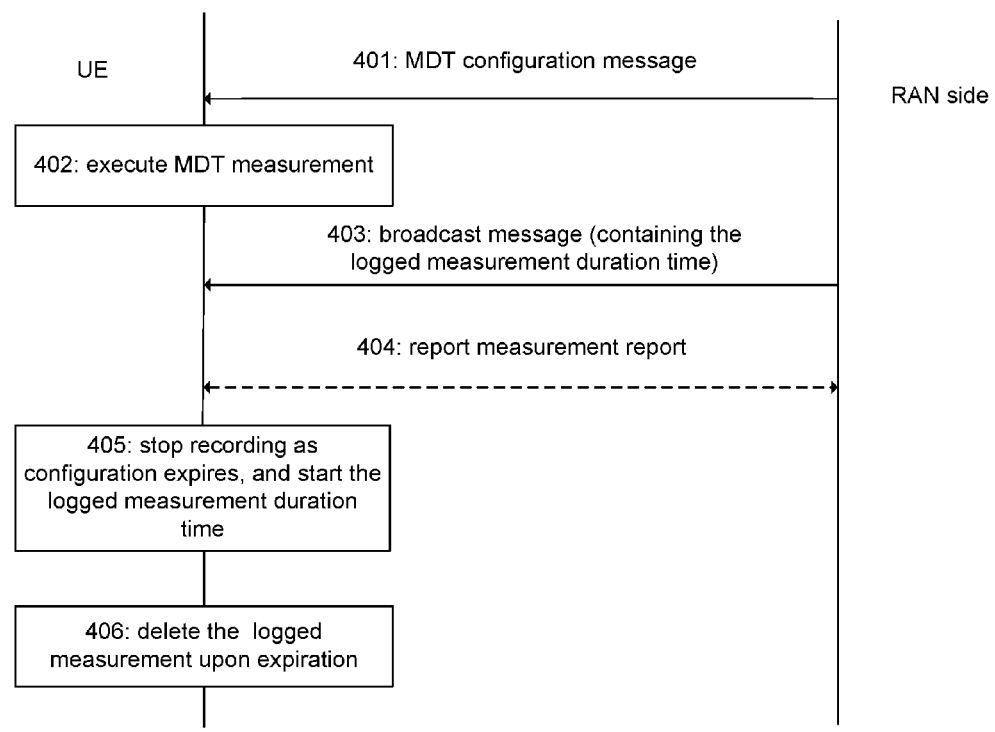
FIG. 4 shows a diagram of a method for controlling DT logged measurement implemented by sending logged measurement duration time through a broadcast message according to the disclosure.

The DT Measurement Control Process Performed by Setting the Logged Measurement Duration Time Through a Broadcast Message (see FIG. 4)

Step 401: when the UE performs RRC connection establishment in a serving cell, the network side sends through a dedicated DT configuration message (for example, MDT-MeasConfiguration), DT measurement configuration information of delayed report (Logged MDT measurement configuration) wherein the DT configuration information includes measurement configuration content (for example, measurement frequency, cell, conditions of event triggering record) and the configuration duration time.

Step 402: the measurement configuration takes effect after the UE receives the DT configuration information; at this moment, the configuration duration time starts. After the UE enters IDLE state, the UE performs, records, and stores the related measurement when the measurement triggering conditions of DT are met (for example, periodic pilot frequency measurement, or when serving cell signal is less than a threshold value).

Step 403: the network side brings, through a broadcast system message (for example, SIB1), the logged measurement duration time (for example, LogKeep Timer) to the UE performing the DT measurement in the serving cell.

Step 404: when entering connection state again, the UE notifies the network side is through a "Log Available" indication in RRCConnectionComplete that there is a DT measurement result available for reporting; after obtaining the notification by the indication, the network side requests the UE to report the DT measurement result, through a UEInformationRequest message; and the UE reports the measurement result through a UEInformationResponse message.

Step 405: the UE continues to record the measurement according to the previous measurement configuration after entering IDLE state; when the configuration duration time expires, the logged measurement duration time of DT starts; and the UE stops recording the measurement but still reserves the measured and unreported measurement result.

Step 406: the UE enters connection state again within the logged measurement duration time, however, without the network side requesting the UE to report the measurement result; when the logged measurement duration time expires, the UE deletes the reserved and unreported measurement result.

The measurement process of the UE under a DT measurement configuration of delayed report ends. The network side can send a new measurement configuration to the UE again to execute a new measurement process.

Embodiment 4

Figure 5:
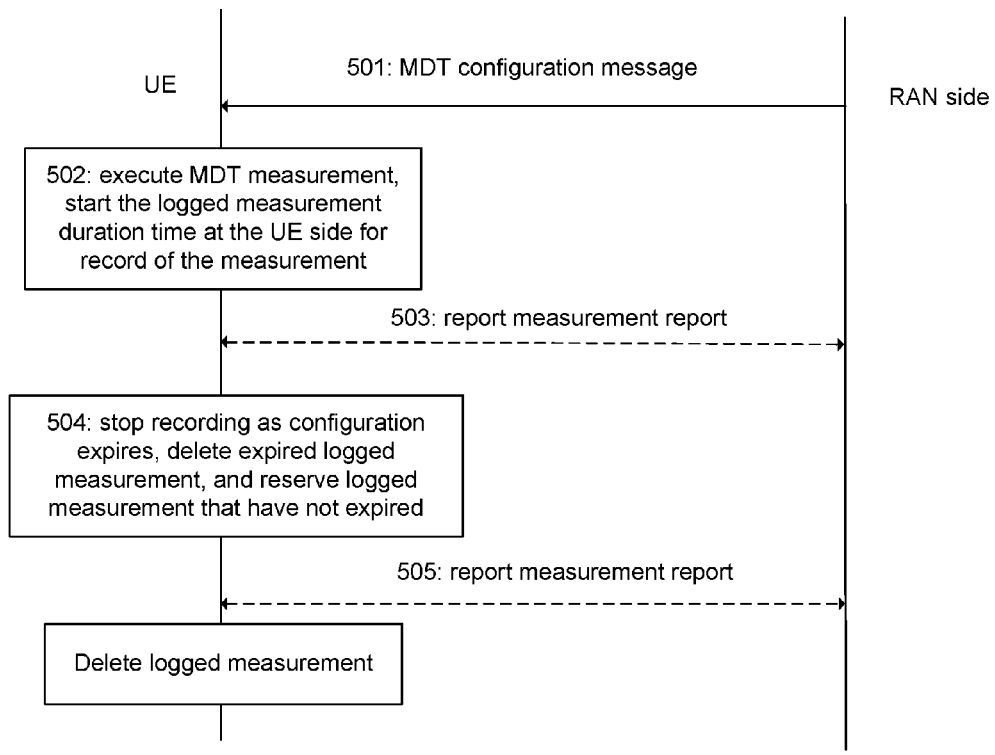
FIG. 5 shows a diagram of a method for controlling DT logged measurement by the UE through the logged measurement duration time set by the UE itself according to the disclosure.

The DT Measurement Control Process Performed Via Setting the Logged Measurement Duration Time by the UE Itself (See FIG. 5)

Step 501: when the UE performs RRC connection establishment in a serving cell, the network side sends through a dedicated DT configuration message (for example, MDT-MeasConfiguration), DT measurement configuration information of delayed report (Logged MDT measurement configuration) wherein the DT configuration information includes measurement configuration content (for example, measurement frequency, cell, conditions of event triggering record) and the configuration duration time.

Step 502: the measurement configuration takes effect after the UE receives the DT configuration information; at this moment, the configuration duration time starts. After the UE enters IDLE state, the UE performs, records, and stores the related measurement when the measurement triggering conditions of DT are met (for example, periodic pilot frequency measurement, or when serving cell signal is less than a threshold value), and starts the logged measurement duration time (for example, LogKeep timer) set by the UE itself for each measurement result when the measurement is result is recorded.

Step 503: the UE enters connection state again and notifies the network side through a "Log Available" indication in RRCConnectionComplete that there is a DT measurement result available for reporting; after obtaining the notification by the indication, the network side requests the UE to report the DT measurement result through a UEInformationRequest message; and the UE reports the measurement result through a UEInformationResponse message.

Step 504: the UE continues to record the measurement according to the previous measurement configuration after entering IDLE state; when the configuration duration time expires, the UE stops recording the measurement but still reserves the recorded measurement result; if the duration time corresponding to a measurement record expires, the UE deletes the measurement record but still reserves those measurement records which do not expire yet.

Step 505: the UE enters connection state again within the logged measurement duration time, reports the stored DT measurement result to the network side similar to Step 503, and deletes the measurement result.

The measurement process of the UE under a DT measurement configuration of delayed report ends. The network side can send a new measurement configuration to the UE again to execute a new measurement process.

Figure 6:
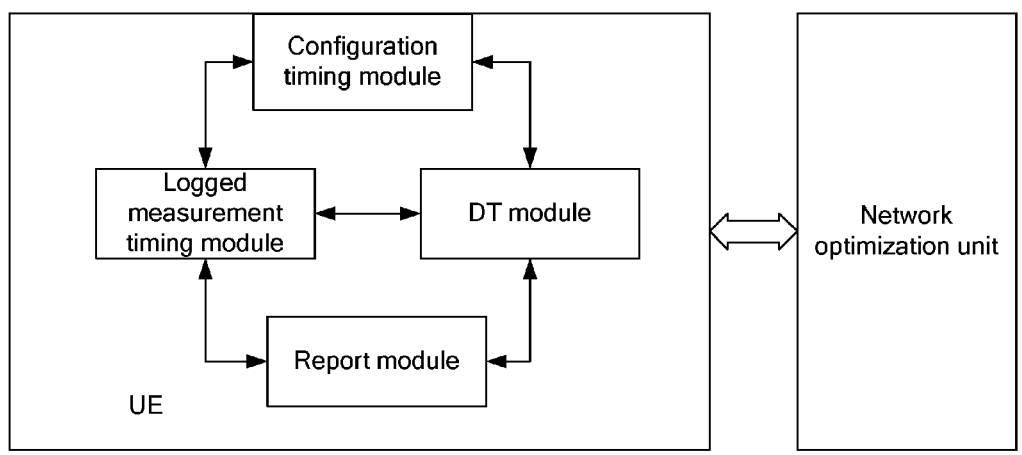
FIG. 6 shows a diagram of a modular structure of a DT system according to the disclosure.

In order to realize the method above, the disclosure further provides a DT system, as shown in FIG. 6, the DT system comprises a UE and a network optimization unit, wherein the UE is configured to receive the logged measurement duration time sent by the network optimization unit, record and reserve a measurement result from DT, and delete the measurement result when the logged measurement duration time expires or the measurement result is reported during the logged measurement duration time;

the network optimization unit is implemented at the network side and is configured to send DT configuration information including the logged measurement duration time to the UE and receive the DT measurement result reported by the UE.

Specifically, the UE comprises:

a logged measurement timing module which is configured to perform logged measurement timing, and notify a DT module to delete the DT result when the logged measurement duration time expires; wherein the logged measurement duration time is sent by the network optimization unit;

a DT module which is configured to receive the DT configuration information sent by the network optimization unit, perform DT according to the DT configuration, record and reserve the DT result, and delete the DT result when receiving a notification from the logged measurement timing module or a report module;

a report module which is configured to report the DT result, and notify the DT module to delete the DT result after reporting the DT result.

Further, the DT configuration information sent by the network optimization unit further includes the configuration duration time; the UE further comprises a configuration timing module connected with the DT module and the logged measurement timing module, wherein the configuration timing module is configured to perform configuration duration timing, and notify the DT module to stop DT and notify the logged measurement timing module to start timing when the configuration duration time expires.

Or, the DT module is further configured to notify the logged measurement timing module to start timing when recording a first measurement result, or notify the logged measurement timing module to start timing for each measurement result as the measurement result is being recorded.

The network optimization unit sends the logged measurement duration time through a DT dedicated message or a common message.

The report module is further configured to notify the logged measurement timing module to stop timing instantly after reporting the DT result.

Besides, the disclosure further provides a UE, including a DT module, a logged measurement timing module and a report module, wherein the logged measurement timing module is configured to perform timing, and notify the DT module to delete the DT result when the logged measurement duration time expires; wherein the logged measurement duration time is preset by the UE;

the DT module is connected with the logged measurement timing module and is configured to perform DT, record and reserve the DT result, and delete the DT result when receiving a notification from the logged measurement timing module or the report module;

the report module is connected with the DT module and is configured to report the DT result, and notify the DT module to delete the DT result after reporting the DT result.

The DT module performs DT according to the DT configuration information sent by the network side, wherein the DT configuration information includes the configuration duration time; the UE further comprises a configuration timing module connected with the DT module and the logged measurement timing module, wherein the configuration timing module is configured to perform configuration duration timing, and notify the DT module to stop DT and notify the logged measurement timing module to start timing when the configuration duration time expires.

Or, the DT module is further configured to notify the logged measurement timing module to start timing when recording a first measurement result, or notify the logged measurement timing module to start timing for each measurement result as the measurement result is being recorded.

The report module is further connected with the logged measurement timing module and is configured to notify the logged measurement timing module to stop timing instantly after reporting the DT result.

The ordinary technicians in the field will understand that all or part of the steps in the previous method can be implemented through command of related hardware by a program; wherein the program can be stored in a computer readable storage medium, for example, read-only memory, disk or compact disc. Optionally, all or part of the steps of the previous embodiments can also be implemented using one or more integrated circuits. Correspondingly, each module/unit in the previous embodiments can be implemented as a hardware, or as a software functional module. The disclosure is not limited to any specific form of combination of hardware and software.

INDUSTRIAL APPLICABILITY

By sending a DT dedicated logged measurement duration time to a UE by a network side or setting the DT dedicated logged measurement duration time by the UE itself, the disclosure controls the length of the duration time in which the DT measurement result is reserved by the UE, making the UE more efficient in reporting the measurement result and managing the storage space, therefore saving memory space.

The invention claimed is:

1. A method for controlling Drive Test (DT) logged measurement, comprising:

sending, by a network side, a logged measurement duration to a User Equipment (UE), or setting the logged measurement duration by the UE itself;

performing, by the UE, a DT and logging a measurement result of the DT during a configuration duration; and stopping the logging when the configuration duration expires; and deleting, by the UE, the logged measurement result when the logged measurement duration expires, wherein a logged measurement duration timer starts logged measurement timing when the configuration duration expires, or when a first measurement result is recorded, or starts logged measurement timing for each measurement result when each measurement result is recorded.

2. The method according to claim 1, wherein the step of deleting, by the UE, the logged measurement result is triggered by previously occurred expiration of the logged measurement duration.

3. The method according to claim 1, wherein in the step of sending, by a network side, a logged measurement duration to a UE, the network side sends the logged measurement duration through a DT dedicated configuration (MDTMeasConfiguration) message, a Radio Resource Control (RRC) connection release (RRCConnectionRelease) message, an RRC reconfiguration (RRCConnection Reconfiguration) message, an eNB Configuration Update message, or a common message.

4. A DT system, comprising a UE and a network optimization unit, wherein the UE is configured to receive a logged measurement duration sent by the network optimization unit, perform a DT and log a measurement result of the DT during a configuration duration, stop the logging when the configuration duration expires, and delete the logged measurement result when the logged measurement duration expires;

the network optimization unit is implemented at a network side and is configured to send DT configuration information including the logged measurement duration to the UE, wherein a logged measurement duration timer starts logged measurement timing when the configuration duration expires, or when a first measurement result is recorded, or starts logged measurement timing for each measurement result when each measurement result is recorded.

5. The system according to claim 4, wherein the UE comprises:
- a logged measurement duration timer, configured to perform logged measurement timing, and notify a DT module to delete the logged measurement result of the DT when the logged measurement duration expires; and
- the DT module, connected with the logged measurement duration timer, and configured to: receive the DT configuration information sent by the network optimization unit, perform the DT according to the DT configuration, log the measurement result of the DT, and delete the logged measurement result of the DT when receiving a notification from the logged measurement duration timer.

6. The system according to claim 5, wherein the DT configuration information sent by the network optimization unit further comprises the configuration duration; wherein the UE further comprises a configuration timing module duration timer connected with the DT module and the logged measurement duration timer, wherein the configuration duration timer is configured to perform configuration timing, and notify the DT module to stop the DT and notify the logged measurement duration timer to start logged measurement timing when the configuration duration expires.

7. The system according to claim 5, wherein the DT module is further configured to notify the logged measurement duration timer to start logged measurement timing when a first measurement result is recorded, or notify the logged measurement duration timer to start logged measurement timing for each measurement result when each measurement result is recorded.

8. The system according to claim 4, wherein the network optimization unit is configured to send the DT configuration information to the UE through a DT dedicated message or a common message.

9. A User Equipment (UE), comprising a Drive Test (DT) module and a logged measurement duration timer, wherein
- the logged measurement duration timer is configured to perform logged measurement timing, and notify the DT module to delete a logged measurement result of a DT when a logged measurement duration expires; wherein the logged measurement duration is preset by the UE;
- the DT module is connected with the logged measurement duration timer and is configured to perform the DT, log the measurement result of the DT, and delete the logged measurement result of the DT when receiving a notification from the logged measurement duration timer.

10. The UE according to claim 9, wherein the DT module is configured to perform the DT according to DT configuration information sent by a network side, wherein the DT configuration information includes a configuration duration;
- the UE further comprises a configuration duration timer connected with the DT module and the logged measurement duration timer, wherein the configuration duration timer is configured to perform configuration timing, and notify the DT module to stop the DT and notify the logged measurement duration timer to start logged measurement timing when the configuration duration expires.

11. The UE according to claim 9, wherein the DT module is further configured to notify the logged measurement duration timer to start logged measurement timing when a first measurement result is recorded, or notify the logged measurement duration timer to start logged measurement timing for each measurement result when each measurement result is recorded.

* * * * *